(12) United States Patent
Schulz et al.

(10) Patent No.: US 7,992,838 B2
(45) Date of Patent: Aug. 9, 2011

(54) BALL POPPET VALVE HAVING VALVE BODY WIDENING IN FUNNEL SHAPE

(75) Inventors: Florian Schulz, Villingen-Schwenningen (DE); Gerd Strobel, Villingen-Schwenningen (DE)

(73) Assignee: Kendrion Binder Magnete GmbH, Villingen-Schwenningen (DE)

( * ) Notice: Subject to any disclaimer, the term of this patent is extended or adjusted under 35 U.S.C. 154(b) by 391 days.

(21) Appl. No.: 12/026,821

(22) Filed: Feb. 6, 2008

(65) Prior Publication Data
US 2008/0185542 A1    Aug. 7, 2008

(30) Foreign Application Priority Data

Feb. 7, 2007   (DE) .......................... 10 2007 006 871

(51) Int. Cl.
*F16K 31/12* (2006.01)
(52) U.S. Cl. .................. 251/129.14; 251/339
(58) Field of Classification Search ............. 251/129.14, 251/129.15, 339
See application file for complete search history.

(56) References Cited

U.S. PATENT DOCUMENTS

| | | | |
|---|---|---|---|
| 2,229,499 A | 1/1941 | Fisette | |
| 2,393,442 A | 1/1946 | Yellott et al. | |
| 2,792,195 A * | 5/1957 | Mosbacher | 251/77 |
| 2,831,650 A * | 4/1958 | Richardson | 251/129.07 |
| 2,851,007 A | 9/1958 | Kagan | |
| 3,529,805 A | 9/1970 | Callahan, Jr. et al. | |
| 3,731,880 A * | 5/1973 | Williams | 239/585.1 |
| 3,791,413 A | 2/1974 | Muller et al. | |
| 4,721,284 A | 1/1988 | Bankard | |
| 6,418,967 B1 | 7/2002 | Frei et al. | 13/44 |
| 6,497,246 B1 | 12/2002 | Nicewarner et al. | |
| 6,708,725 B2 | 3/2004 | Entwistle et al. | |
| 7,201,188 B2 * | 4/2007 | Baumann | 137/625.33 |
| 2005/0076955 A1 | 4/2005 | Boehland et al. | 15/18 |

FOREIGN PATENT DOCUMENTS

| | | | |
|---|---|---|---|
| DE | 1 224 577 | 9/1966 | 22/4 |
| DE | 1 229 354 | 1/1971 | |
| DE | 39 08 859 | 9/1990 | 31/6 |
| DE | 44 19 168 | 12/1995 | 1/30 |

* cited by examiner

*Primary Examiner* — John K Fristoe, Jr.
(74) *Attorney, Agent, or Firm* — O'Shea Getz P.C.

(57) ABSTRACT

The invention relates to a ball poppet valve, in particular an electromagnetically actuated ball poppet valve, having a valve body, an accommodating aperture disposed in the valve body for a ball poppet, and a valve bore also disposed in the valve body, a ball poppet for closing the valve bore and a control stem acting on the ball poppet. The accommodating aperture of the valve body, starting from a cylindrical wall part of constant diameter in which the ball poppet sits, widens at an end opposite the control stem in at least approximately a funnel shape.

18 Claims, 5 Drawing Sheets

Ball poppet valve with optimized opening behavior and characteristic

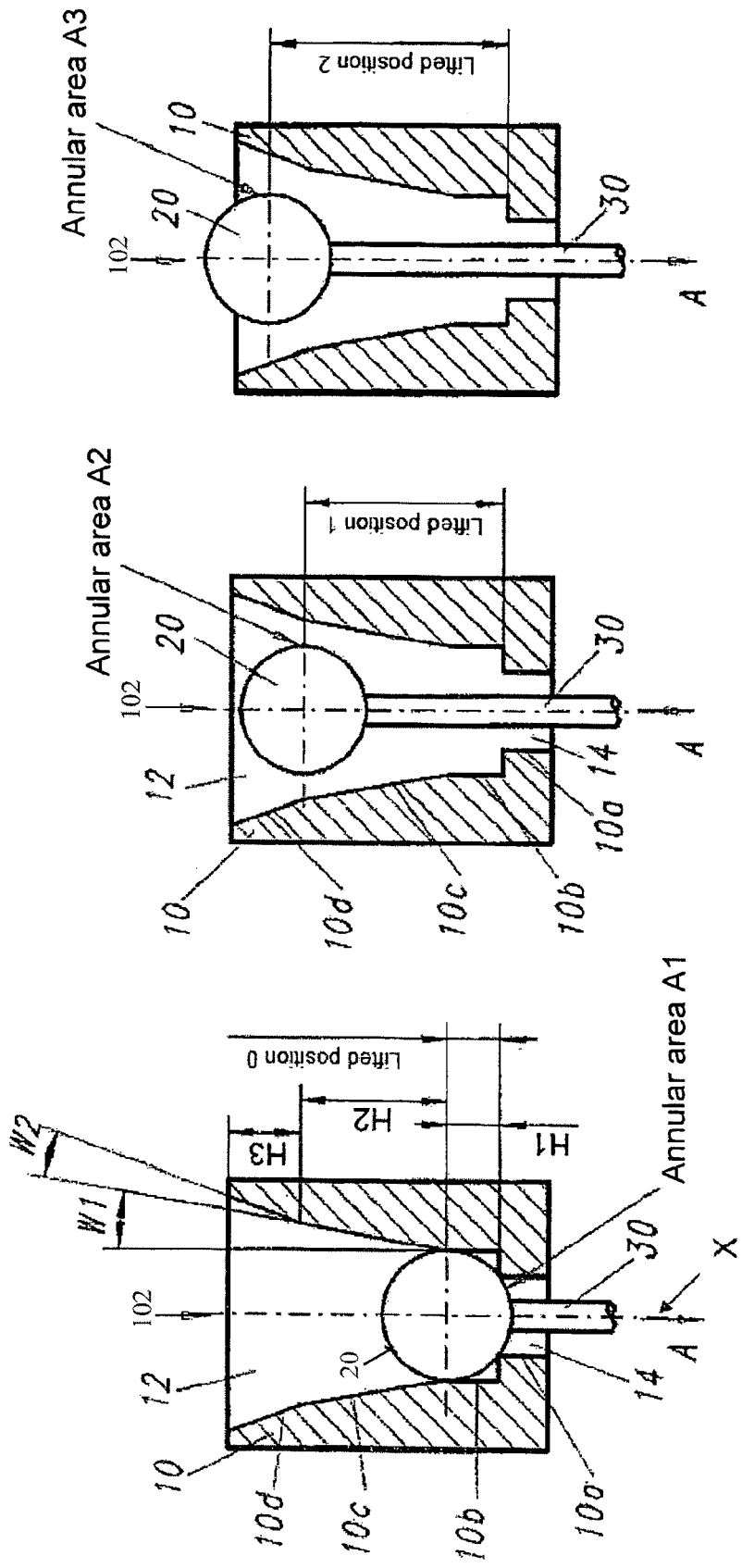

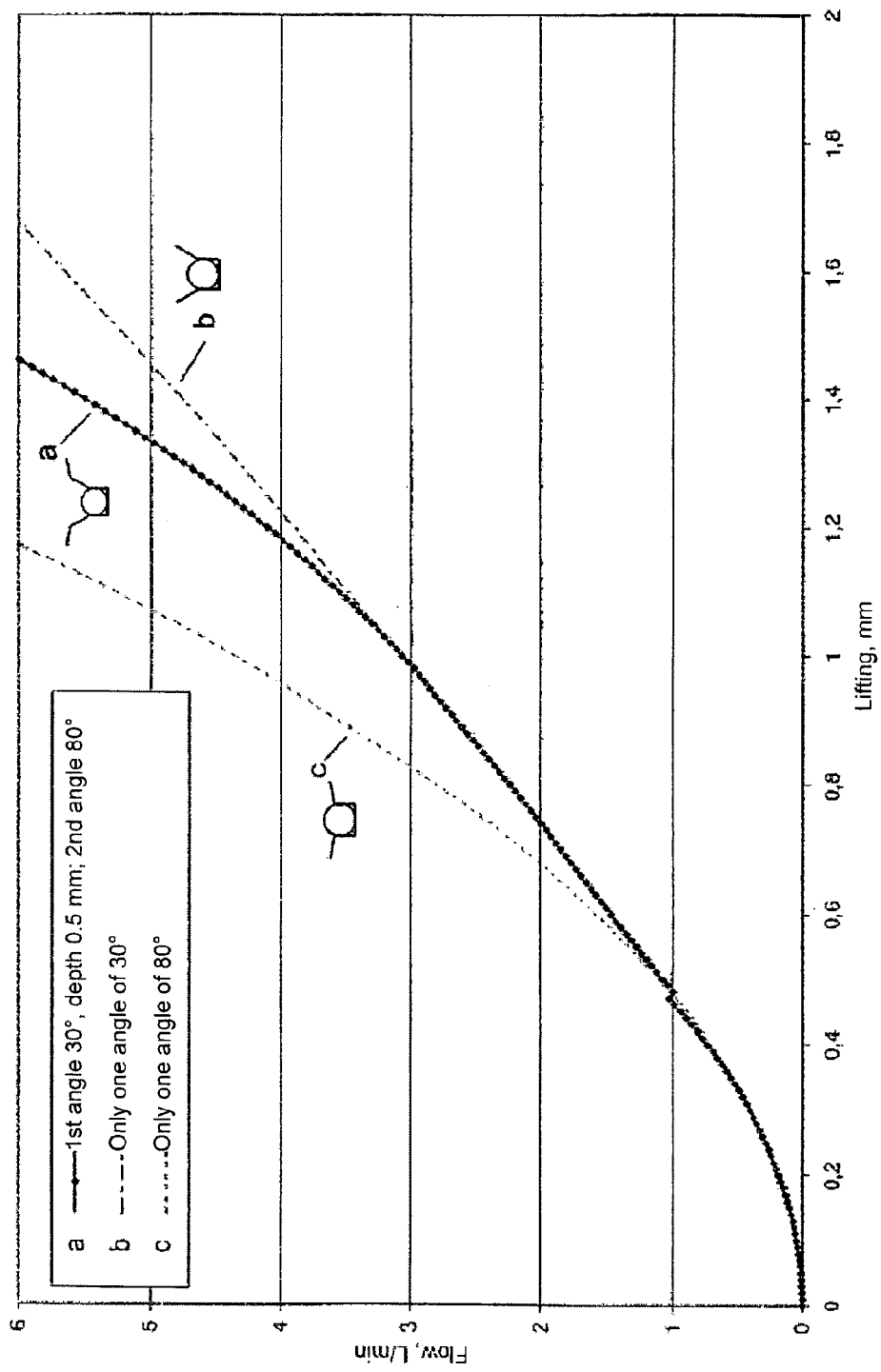

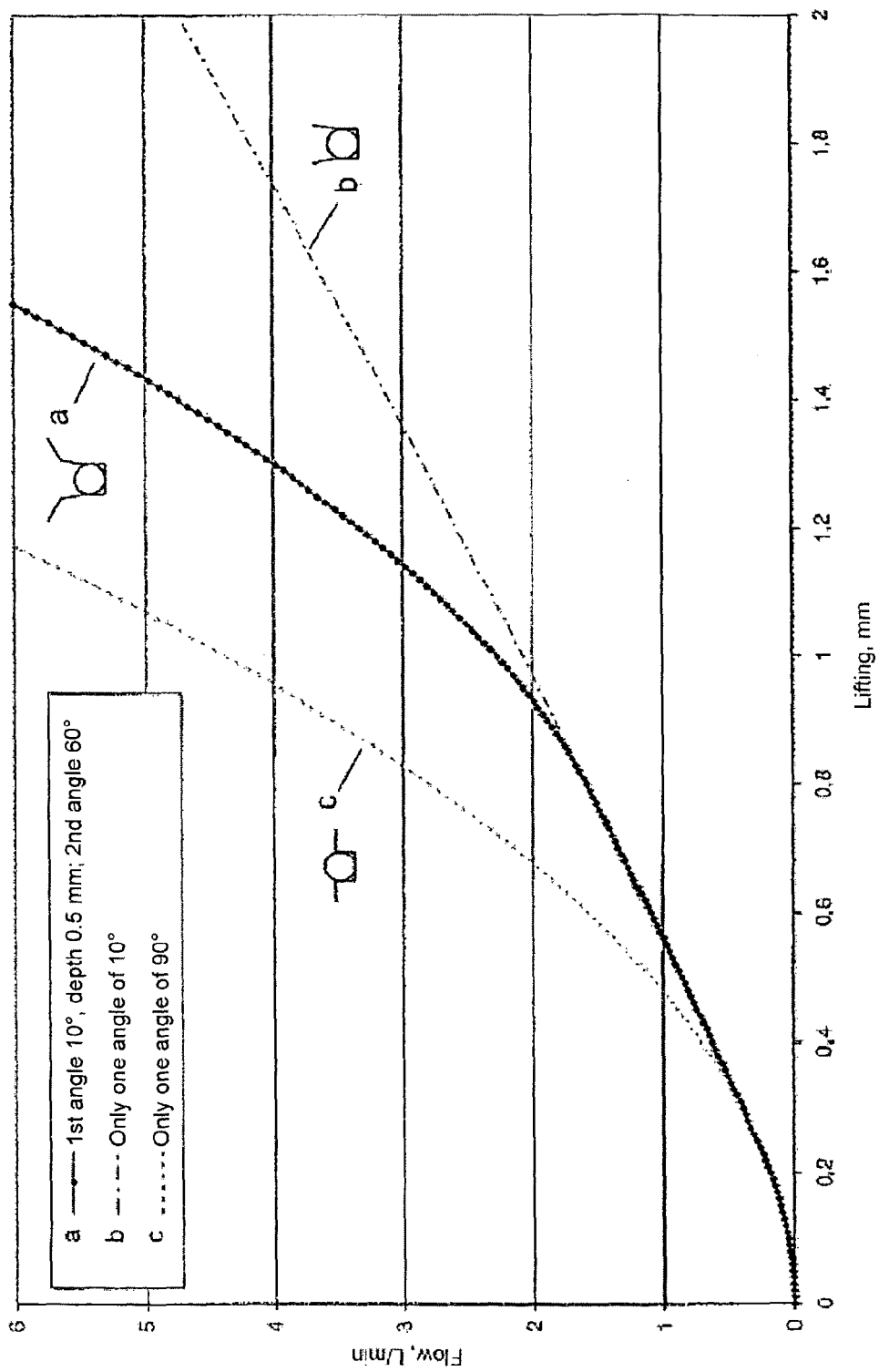

BALL POPPET VALVE HAVING VALVE BODY WIDENING IN FUNNEL SHAPE

PRIORITY INFORMATION

This patent application claims priority from German Application No. 10 2007 006 871.0 filed Feb. 7, 2007, which is hereby incorporated by reference.

BACKGROUND OF THE INVENTION

The present invention relates to poppet valves and in particular to ball poppet valves which are generally known from the prior art and are employed as directional control valves or shutoff valves having a freely movable ball poppet as a shutoff element. Ball poppet valves are distinguished by simplicity of construction and a high degree of freedom from leakage and are therefore very well suited to many applications.

In a ball poppet valve according to the prior art, control action is achieved in that an annular flow area A established by lifting of a control stem between a ball poppet and a control edge on the valve aperture is smaller than the maximal flow area $A_{max}$ bounded by the control stem and the valve bore. However, because this flow area between the ball poppet and the control edge reaches the maximal flow area $A_{max}$ when the ball poppet is lifted even very slightly, adequate control action can not be achieved with ball poppet valves according to the prior art.

A problem with prior art ball poppet valves is that, because of their structural form, they enable a relatively large flow when the ball poppet is lifted even a small amount off the valve aperture. Electromagnetically actuated ball poppet valves for example exhibit a large flow for even a small current flowing in an exciter coil. In electromagnetically controlled ball poppet valves of the kind identified above, this relationship manifests itself in a steep Q-I characteristic (flow-current characteristic) and has the disadvantage that only slight control of the flow is possible with such a ball poppet valve.

Gate valves are also known wherein the ports are connected to or separated from one another by a sliding element, the so-called gate. The movement of the gate here can be axial or rotational, a flow control action being achieved with individual chambers or channels. Gate valves are characterized by good control behavior and, in the example of electromagnetic actuation, by a flat Q-I characteristic. Such gate valves have the disadvantage that 100% freedom from leakage cannot be achieved because of manufacturing tolerances and the functional construction of the valves.

There is a need for a ball poppet valve that exhibits both a high degree of freedom from leakage and a configurable control characteristic. In the case of electromagnetically actuated ball poppet valves in particular, the flow-current characteristic should be adjustable over a wide range.

SUMMARY OF THE INVENTION

A ball poppet valve includes a valve body that provides an accommodating aperture for a ball poppet. When the valve bore is closed the ball poppet sits in a cylindrical wall part, starting from and adjacent to which is a wall part of the valve body having a diameter widening in funnel fashion. By virtue of this valve body diameter widening in funnel fashion, an annular area between the ball poppet and the valve body can be varied in dependence on the axial position of the ball poppet. In valve bodies widening in funnel shape, this annular area through which a controlled medium flows becomes larger the farther the ball poppet is removed from the valve bore to be closed in the valve body. Depending on the way in which the accommodating aperture of the valve body is shaped, the annular areas are thus adjustable and freely selectable over the entire lifting range of the ball poppet.

If these annular areas are so sized as to be smaller than the aperture area of the ball poppet valve, then a well-defined flow of the controlled medium is correlated with a well-defined lifting of the ball poppet. It is possible as a result to configure the characteristic (the flow-current characteristic in the case of electromagnetically actuated ball poppet valves) in arbitrary fashion. Here the expression aperture area means the area given by the valve bore minus the cross-sectional area of the control stem located in the valve bore.

It lies within the scope of the invention to widen the accommodating aperture for the ball poppet in the valve body in funnel shape. This widening in funnel shape can be realized for example by widening the accommodating aperture of the valve body conically at an angle beginning from a cylindrical shell surface. It also lies within the scope of the invention to realize this widening in funnel shape with two angles adjacent as viewed in section. An arcuate or parabolic widening of the accommodating aperture is also conceivable. Wall sections of equal diameter can also be located in the funnel-shaped widening.

The substantial advantage of a ball poppet valve according to the invention is that because of the special shaping of the accommodating aperture of the valve body, a well-defined flow of the controlled medium can be associated with every lifting position. Thus the QI characteristic (flow-current characteristic) in the case of electromagnetically actuated ball poppet valves can be purposefully configured. In addition, the shaping of the valve body according to the invention increases the restoring forces on the ball poppet, leading to less hysteresis. The valve bore can be cleanly opened by an increased opening lift in the low-quantity range of the flowing medium, without discontinuities in the characteristic. Because the characteristic is configured by a ball poppet via a reduced diameter of the annular areas mentioned, the characteristic is fundamentally free of jumps and discontinuities.

These and other objects, features and advantages of the present invention will become more apparent in light of the following detailed description of preferred embodiments thereof, as illustrated in the accompanying drawings.

BRIEF DESCRIPTION OF THE DRAWINGS

FIGS. 3A to 3C illustrate an embodiment of a ball valve having a valve body that widens conically at two angles, in various axial positions of the ball poppet;

FIG. 4 illustrates various characteristic curves in the case of a ball poppet valve according to the invention; and FIG. 5 illustrates further characteristic curves for ball poppet valves according to the invention.

DETAILED DESCRIPTION OF THE INVENTION

Figure 1:
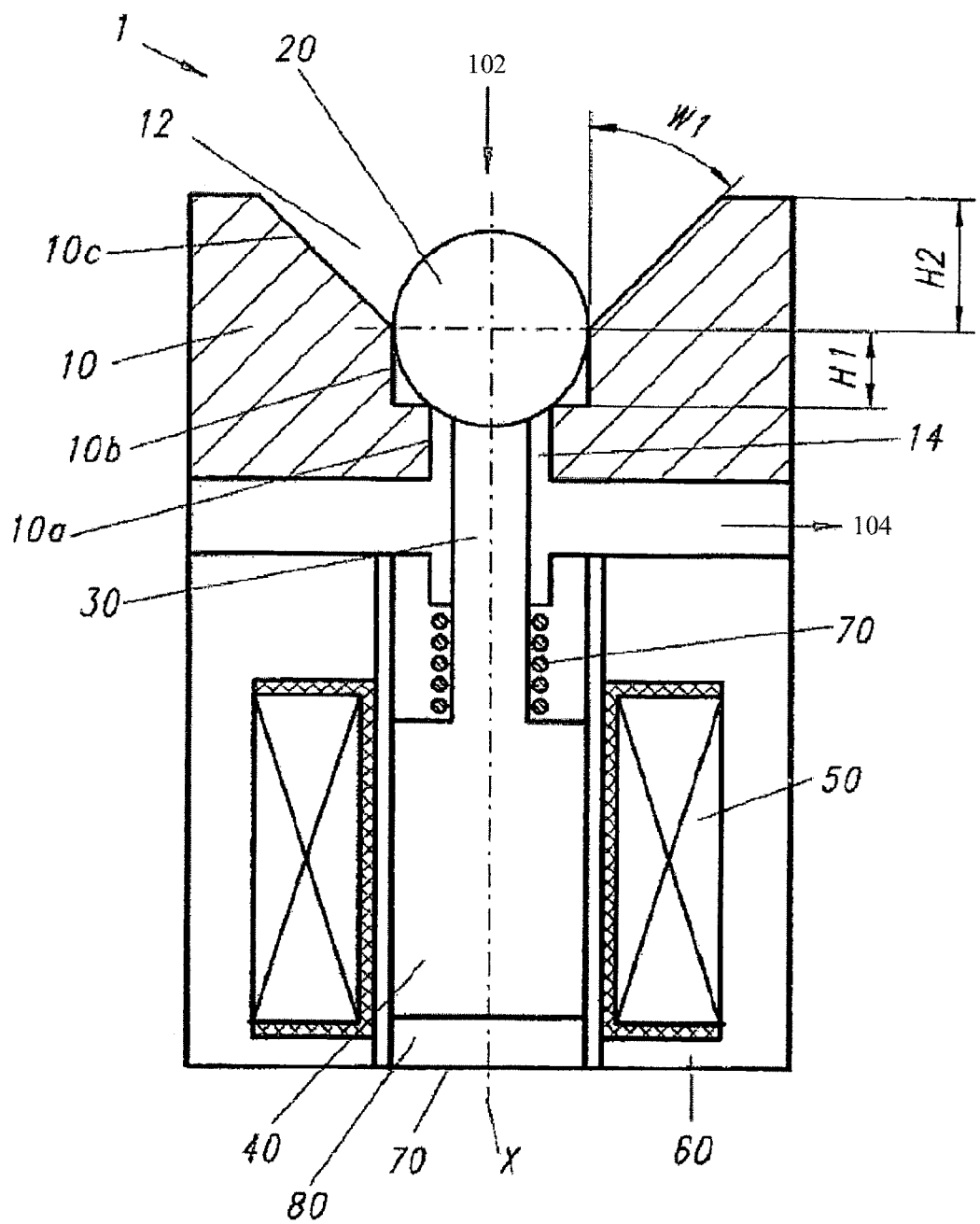
FIG. 1 is a cross-sectional illustration of an embodiment of an electromagnetically actuated ball poppet valve.

FIG. 1 is a cross-sectional illustration of a simplified form of an electromagnetically actuated ball poppet valve 1. This ball poppet valve 1 controls the flow of a medium, which is admitted to the ball poppet valve 1 via an inlet 102 and again discharged via an outlet 104. The ball poppet valve 1 includes a valve body 10 having an accommodating aperture 12 for accommodating a ball poppet 20. In the rest position of the ball poppet valve 1, the ball poppet 20 closes a valve bore 14 located in the valve body 10. For example the ball poppet 20 may be in fixed connection with a control stem 30, which is connected to an armature 40 of an electromagnet. The control stem 30 with the ball poppet 20 is pressed into the valve bore 14 by a spring mechanism 70. The armature 40 is located in a tubular aperture of a housing 60 of the electromagnet, wherein an exciter coil 50 is disposed around the armature 40. The housing 60 of the electromagnet serves to guide a magnetic flux when current flows through the exciter coil 50. The housing 60 also exhibits a pole core 80, which sits endwise at the flat end of the armature 40 at the end away from the control stem 30.

A current flowing through the exciter coil 50, because of the magnetic flux generated, enables the armature 40 to move against the force of the spring 70 and lift the ball poppet 20 from the valve bore 14 under guidance via the control stem 30. As a result of the lifting of the ball poppet 20 from the valve bore 14, medium can flow from the inlet 102 to the outlet 104 of the ball poppet valve. The farther the ball poppet 20 is lifted off the valve bore 14, the more medium flows through the ball poppet valve 1. As more current flows, that is, as the current through the exciter coil 50 increases, a larger and larger quantity of medium can be conveyed through the ball poppet valve 1.

This is where the invention comes into play for purposefully configuring the flow-current characteristic of the ball poppet valve 1.

To this end, in the valve body 10, the accommodating aperture 12 in which the ball poppet 20 sits is made in a special funnel shape.

As can be seen from FIG. 1, the valve body 10 exhibits in the region of the valve bore 14 a wall part 10a having a cylindrical shape. The control stem 30 is guided through the wall part 10a. The aperture of the valve bore 14 widens adjacently into a likewise cylindrical wall part 10b having a diameter that roughly matches the diameter of the ball poppet 20. Adjacent to this wall part 10b is a wall part 10c that widens conically or in funnel shape. As viewed in the section of FIG. 1, the widening takes place at an angle W1. The wall part 10b extends over a height H1 about equal to half the diameter of the ball poppet 20. The wall part 10c widening in funnel shape has a height H2.

Purposeful shaping of the funnel-shaped aperture of the valve body 10 makes it possible to influence the QI characteristic of the ball poppet valve 1.

Figure 2:
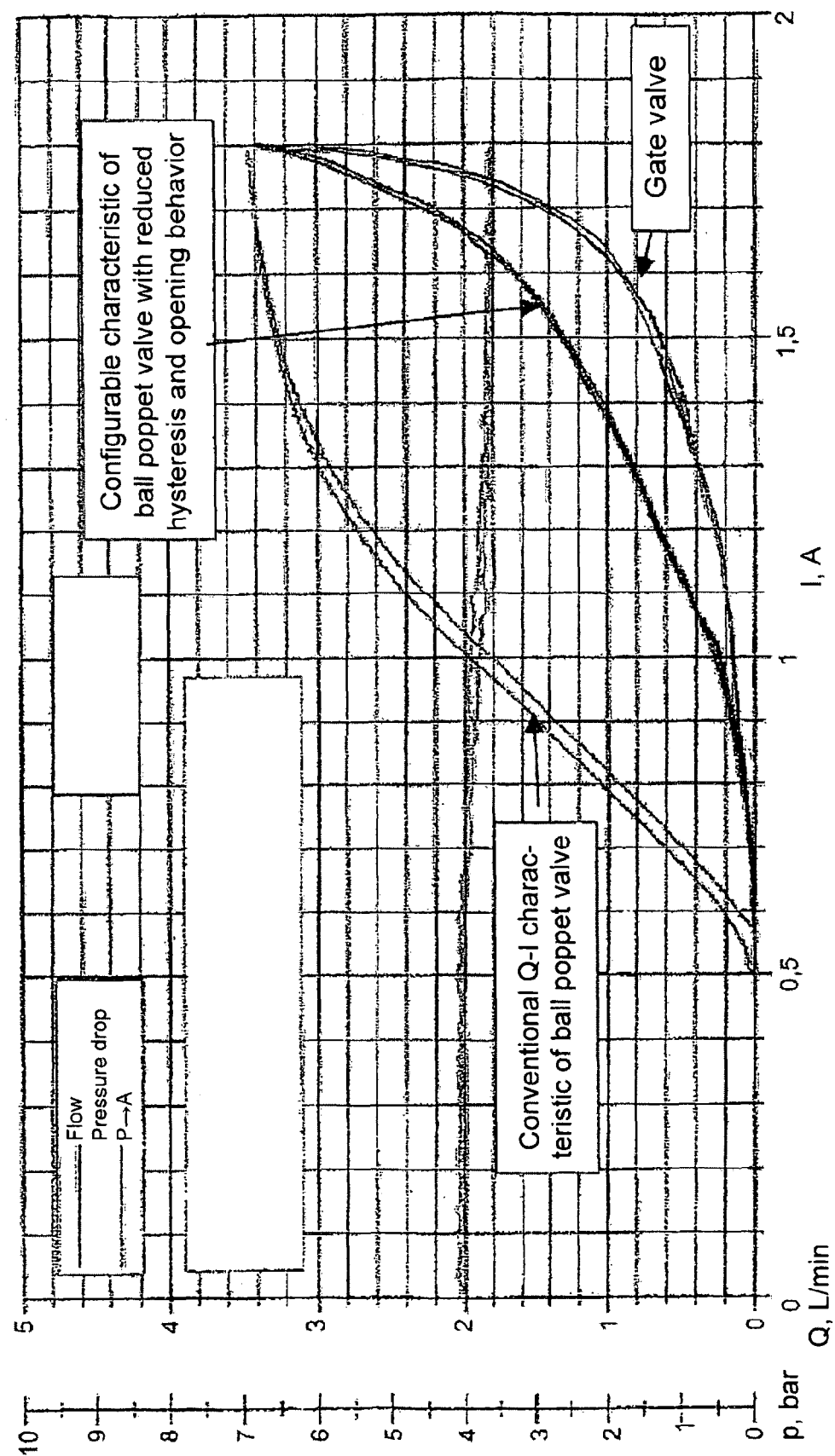
FIG. 2 illustrates characteristic curves of a prior art ball poppet valve as well as a prior art gate valve and a characteristic of a ball poppet valve according to the invention.

For better understanding in this connection, reference is made to the characteristics of FIG. 2. Three distinct QI characteristics are depicted in FIG. 2. A flow Q in L/min is plotted against the vertical axis, while a current I in amperes, the current conveyed through an exciter coil of an electromagnetically actuated ball poppet valve, is plotted against the horizontal axis. The approximately S-shaped characteristic shown at left depicts the behavior of conventional ball poppet valves wherein a ball poppet sits in an accommodating aperture of a valve body and this accommodating aperture exhibits a cylindrical wall of constant diameter. It can be seen clearly that this characteristic exhibits a comparatively steep slope; that is, the flow increases greatly when the current increases relatively little.

What is shown at far right in FIG. 2 is the characteristic of a conventional gate valve. Such a gate valve is distinguished in that initially the flow through the gate valve increases only slightly when the current changes relatively much. At its end, however, the characteristic is comparatively steep.

With a ball poppet valve such as is depicted for example in FIG. 1, a characteristic lying between the two characteristics described and having an almost arbitrary shape can be configured.

FIGS. 3A-3C are cross-sectional illustrations of the ball poppet valve 1 having optimized aperture and characteristic with the ball poppet 20 in various axis positions. For the sake of simplicity of illustration, the ball poppet valve 1 is depicted only in the region of the valve body 10.

In this embodiment, the valve body 10 is fashioned with two widening angles W1 and W2. This means that on the valve bore 14 having the cylindrical wall part 10a, cylindrical wall part 10b first extends in turn over a height H1 that is roughly approximately equal to half the diameter of the ball poppet 20. Next, the accommodating aperture 12 widens with a first angle W1 relative to longitudinal axis X and then with a further angle W2. The wall part 10c extends over a height H2, and the wall part 10d with angle W2 extends over a height H3. The first angle W1 can lie for example between 1° and 45°, preferably between 5° and 30°, and the second angle W2 can lie between 55° and 85°. In any case the second angle W2 should be greater than first angle W1 but not greater than 85°. The first angle W1 should exhibit a height H2 equal to at most about 70% of the total lift that the ball poppet 20 can execute.

In FIG. 3A the ball poppet 20 is in its position maximally withdrawn into the accommodating aperture 12 of the valve body 10. The ball poppet 20 seals the valve bore 14. Annular areas A1 identified in FIG. 3A mark the area given by the area of the valve bore 14 minus the cross-sectional area of the control stem 30. This annular area A1 is the so-called aperture area of the ball poppet valve 1.

In FIG. 3B the control stem 30 has lifted the ball poppet 20 out of the valve bore 14. The ball poppet 20 is located roughly at the transition from the first wall part 10c widening in funnel shape to the second wall part 10d widening in funnel shape. In this position of the ball poppet 20, a flow medium bounded by annular area A2 between the ball poppet 20 and the valve body 10 can flow through inlet 102.

In FIG. 3C the ball poppet 20 is shown still farther lifted out of the valve body 10. As a result, the flow medium can flow through a larger annular area A3, which again is given by the clearance between the ball poppet 20 and the valve body 10.

Thus annular areas A2 and A3 determine the possible flow of the medium through the ball poppet valve 1. Over the entire lifting range of the ball poppet 20, annular areas A2, A3 can be configured through the choice of the contour of the accommodating aperture 12 of the valve body 1. If annular areas A2 and A3 are smaller than aperture area A1, a well-defined inlet flow is associated with every well-defined lifting of the ball poppet 20. This makes it possible to shape the characteristic of the ball poppet valve in almost arbitrary fashion.

In each of FIGS. 4 and 5 the flow of a medium through the ball poppet valve 1 is plotted versus the lifting and thus the exciting current for the case of a valve seat widening in funnel shape. Curve a in FIG. 4 is the characteristic for a ball poppet valve having a valve body corresponding to the depiction of FIGS. 3A-3C, that is, a first angle W1 and a second angle W2. The first angle W1 has been selected as 30° with a height H2 of 0.5 mm. The second angle W2 is 80°. Curve b in FIG. 4 is markedly flatter starting at a lifting of 1 mm and represents the characteristic for a valve body having just one angle W1 of 30°. Curve c illustrates the characteristic for a valve body wherein angle W1 has been selected as 80°.

FIG. 5 presents similar curves. Again curve a depicts a ball poppet valve having a doubly conically widening valve body 10. First angle W1 is 10° with a height H2 of 0.5 mm. Second angle W2 is 60°. Curve b corresponds to a valve body wherein angle W1 is only 10°, and curve c to a valve body wherein angle W1 is 90°.

What is claimed is:

1. An electromagnetically actuated ball poppet valve, comprising: a valve body, an accommodating aperture disposed in the valve body, a valve bore disposed in the valve body, a ball poppet for closing the valve bore and a control stem acting on the ball poppet, wherein the accommodating aperture of the valve body, starting from a cylindrical wall part of constant diameter, widens at an end opposite the control stem in at least approximately a funnel shape, wherein the valve bore has an inlet, and the ball poppet is seated in the cylindrical wall part of the accommodating aperture against the inlet of the valve bore when the ball poppet valve is in a closed position.

2. The ball poppet valve of claim 1, wherein the cylindrical wall part of the valve body extends at least to half the diameter of the ball poppet when the ball poppet sits sealingly on the valve bore.

3. The ball poppet valve of claim 1, wherein, starting from the cylindrical wall part of the valve body, the accommodating aperture of the valve body widens with a first angle.

4. The ball poppet valve of claim 3, wherein this first angle is between about 1° and 45° relative to a central axis of the ball poppet valve.

5. The ball poppet valve of claim 4, wherein a second angle is adjacent to this first angle.

6. The ball poppet valve of claim 5, wherein this second angle is larger than the first angle and is not greater than 85°.

7. The ball poppet valve of claim 4, wherein, relative to the central axis of the ball poppet valve, a wall part of the valve body with the first angle exhibits a height not greater than roughly 70% of the total lifting of the ball poppet.

8. The ball poppet valve of claim 3, wherein the accommodating aperture of the valve body exhibits an internal contour that, at each of various axial positions of the ball poppet, takes on a well-defined annular area perpendicular to the central axis of the ball poppet valve, said annular area being smaller than an aperture area of the ball poppet valve, the aperture area being defined by the area of the valve bore minus the cross-sectional area of the control stem intruding into the valve bore.

9. The ball poppet valve of claim 8, wherein the annular area lying nearer the valve bore when the ball poppet is lifted off is smaller than the well-defined annular area when the ball poppet is lifted farther off.

10. The ball poppet valve of claim 1, wherein the accommodating aperture of the valve body widens in arcuate or parabolic fashion.

11. A ball poppet valve, comprising:
a valve housing;
a valve bore within the housing where the valve bore has an inlet and an outlet;
a poppet accommodating aperture in the valve housing, where the poppet accommodating aperture has a first segment and a second segment that flares out from the first segment;
a valve stem slideably co-axially located within the valve bore, where the valve stem includes a distal end; and
a ball poppet affixed to the distal end of the valve stem;
where, in a closed position, the ball poppet is seated in the first segment of the poppet accommodating aperture against the inlet of the valve bore to prevent flow of a medium between the accommodating aperture and the valve bore; and
where, in a non-closed position, flow between the inlet and the outlet is a function of how far the ball poppet is moved from the first segment into the second segment.

12. The ball poppet valve of claim 11, where
the first segment comprises a cylindrical side wall that form a cylindrical region in direct contact with the valve bore, where the cylindrical side wall is parallel to a center line of the valve bore; and
the second segment is axially separated from the valve bore by the first segment, where the second segment includes a second side wall that extends outwardly and at a non-zero angle with respect to the center line of the valve bore and from a distal end of the cylindrical side wall.

13. The ball poppet valve of claim 12, where the ball poppet has a radius, and the cylindrical side wall has a height approximately equal to the radius of the ball poppet.

14. The ball poppet valve of claim 11, comprising an electromagnet actuator that slideably moves the valve stem within the valve bore.

15. A ball poppet valve, comprising:
a housing;
a cylindrical bore within the housing where the bore has a flow inlet and a flow outlet;
a poppet accommodating aperture in the housing, where the poppet accommodating aperture has a cylindrical segment and a flared segment;
a valve stem slideably and co-axially located within the bore, where the valve stem includes a distal end and has a constant cross section; and
a ball poppet affixed to the distal end of the valve stem;
where, in a closed position, the ball poppet is seated in the cylindrical segment of the poppet accommodating aperture against the flow inlet of the cylindrical bore to prevent flow of a medium between the poppet accommodating aperture and the cylindrical bore; and
where, in a non-closed position, flow between the inlet and the outlet is controlled as a function of how far the ball poppet is moved from the flow inlet of the cylindrical bore.

16. The ball poppet valve of claim 15, where
the cylindrical segment has a cylindrical side wall in direct contact with the cylindrical bore, where the cylindrical side wall is parallel to a center line of the cylindrical bore; and
the flared segment is axially separated from the cylindrical bore by the cylindrical segment, where the flared segment includes a second side wall that extends outwardly at a non-zero angle with respect to the center line of the cylindrical bore and from a distal end of the cylindrical side wall.

17. The ball poppet valve of claim 3, wherein the first angle is roughly between 5° and 30° relative to a central axis of the ball poppet valve.

18. The ball poppet valve of claim 1, wherein the constant diameter of the cylindrical wall part is substantially equal to a diameter of the ball poppet.

* * * * *